US008116916B1

(12) United States Patent
Zeanah et al.

(10) Patent No.: US 8,116,916 B1
(45) Date of Patent: Feb. 14, 2012

(54) HOMOGENEITY BASED DIVERSITY PREDICTION METHOD FOR TRANSFORMER SELECTION

(75) Inventors: Jefferson G. Zeanah, Sandy Springs, GA (US); Richard G. Huff, Atlanta, GA (US)

(73) Assignee: Southern Company Services, Inc., Atlanta, GA (US)

( * ) Notice: Subject to any disclaimer, the term of this patent is extended or adjusted under 35 U.S.C. 154(b) by 379 days.

(21) Appl. No.: 12/582,448

(22) Filed: Oct. 20, 2009

(51) Int. Cl.
*G05D 17/00* (2006.01)
*G06Q 10/00* (2012.01)
*G01V 3/00* (2006.01)
*G06Q 30/00* (2012.01)
*G05F 1/00* (2006.01)
*G05F 3/06* (2006.01)
*H01F 17/00* (2006.01)

(52) U.S. Cl. ........ 700/291; 323/215; 323/305; 323/355; 324/320; 705/7.31; 705/26.3

(58) Field of Classification Search ............ 705/7, 26.3, 705/31, 7.31; 700/291; 323/215, 305, 355; 324/320
See application file for complete search history.

(56) References Cited

U.S. PATENT DOCUMENTS

| | | | | |
|---|---|---|---|---|
| 3,998,093 | A * | 12/1976 | Bertolasi | 73/114.52 |
| 6,512,966 | B2 * | 1/2003 | Lof et al. | 700/291 |
| 6,988,092 | B1 * | 1/2006 | Tang et al. | 705/7.39 |
| 7,069,161 | B2 * | 6/2006 | Gristina et al. | 702/61 |
| 7,668,671 | B1 * | 2/2010 | Gristina | 702/61 |
| 2003/0135339 | A1 * | 7/2003 | Gristina et al. | 702/61 |
| 2008/0228553 | A1 * | 9/2008 | Bryson et al. | 705/10 |

OTHER PUBLICATIONS

Shattuck et al., "Right Size Your Transformer", Transmission & Distribution World, 2006, p. 36-9.*
Z Solutions, "Transformer Sizing Issues", 2007, 1 page.*
Chen et al., "Implementation of a Systematic Distribution Transformer Load Management in Taipower" IEEE, Mar. 17, 2009. p. 286-295.*
Luze-J.D., "Distribution Transformer Size Optimization by Forecasting Customer Electricity Load", Conference Papers, IEEE, 2009.*
Livik et al., "Estimation of Annual Coincident Peak Demand and Load Curves based on Statistical Analysis and Typical Load Data", IEEE, 1993.*

* cited by examiner

*Primary Examiner* — Albert Decady
*Assistant Examiner* — Thomas Stevens
(74) *Attorney, Agent, or Firm* — Womble Carlyle Sandridge & Rice, LLP

(57) ABSTRACT

A method, system, and computer program product for selecting a transformer size for an industrial or commercial facility. A plurality of end-use connected load data for the facility is entered via a user interface into a memory of a computing system for determining facility load diversities. A base homogeneity is determined for the end-use connected load data. An initial facility diversity is determined based on the end-use connected loads and initial end-use diversities. A total facility diversity is determined based on the initial facility diversity, the base homogeneity, and a total connected load. An expected energy demand is determined based on the total facility diversity and a total connected load. The end-use diversity is adjusted for at least one end-use and a change in expected energy demand for the facility is allocated to each end-use. The transformer size is determined for a total expected energy demand and a total hours use for each connected load.

20 Claims, 9 Drawing Sheets

Transformer Sizing Table

| kVa Load | Annual Hours Use | | | | |
|---|---|---|---|---|---|
| | 0 – 1k | 1k – 3k | 3k – 6k | 6k – 8k | >8k |
| 50 | 45 | 45 | 45 | 75 | 75 |
| 80 | 45 | 45 | 75 | 75 | 75 |
| 110 | 75 | 75 | 112.5 | 112.5 | 112.5 |
| 130 | 112.5 | 112.5 | 150 | 150 | 225 |
| 160 | 112.5 | 150 | 225 | 225 | 225 |
| 190 | 150 | 225 | 225 | 225 | 225 |

| Load Description | 1 Phase | 3 Phase | kW DIV. % | Sum KW | Win KW | Full Load Equiv. | Annual KWH | | Temporary Permanent | Service Dates 8/27/2009 8/27/2009 |
|---|---|---|---|---|---|---|---|---|---|---|
| Ext. Lighting | 1.8 | | | | | 4,300 | 7,740 | | Oper.Engr | |
| Int. Lighting | 5.0 | | 84% | 4.2 | 4.2 | 5,852 | 29,260 | | Arch. | |
| AC (Summer) | | 23.0 | 71% | 16.4 | | 2,056 | 47,288 | | Elec. Engr | |
| Heat Pump | | | | | | | | | Mech.Engr | |
| Resistance Ht | | | | | | | | | Contr. | |
| Air Handling | | | | | | | | | WE Num. | |
| Cooking | 5.0 | | 32% | 1.6 | 1.6 | 4,419 | 22,095 | | Serv. Type | Underground |
| Water Heating | 3.0 | | 35% | 1.0 | 1.0 | 8,210 | 24,630 | | Voltage | 120/208 |
| Refrigeration | 10.0 | | 58% | 5.8 | 5.8 | 5,724 | 57,240 | | Main Size | 400 |
| Misc. | 15.0 | | 76% | 11.5 | 11.5 | 5,426 | 81,390 | | p.f. | 90% |
| Motors | | | | | | | | | Phase | 3 Phase |
| | | | | | | | | | Mtr. Code | |
| | | | | | | | | | Lrg. Mtr. HP | |
| | | | | | | | | | L.Ktr.Amp | |
| | | | | | | | | | Phase | |
| | | | | | | | | | Rate Name | Std |
| | | | | | | | | | Fuel Rate | Conv |
| | | | | | | | | | Rate Rider | GS-Med |
| | | | | | | | | | Rate Type | 7. |
| | | | | | | | | | cnts/KWH | |
| | | | | | | | | | Added Rev | |
| | | | | | | | | | Rev(-)Fuel | |
| | | | | | | | | | %Comp | |
| | | | | | | | | | Deposit | |
| | | | | | | | | | Max KVA | 45 |
| New Load Totals | 39.8 | 23 | 64% | 40.4 | 24.1 | | 269,643 | | | |
| Existing Load Totals | | | | | | | | | | |
| Total Estimates | | | | 40.4 | 24.1 | | 269,643 | | | |
| Data From: | | | | | | | | | | |
| Estimate based on site visit and other known coffee shops. | | | | | | | | | | |

FIG. 9

HOMOGENEITY BASED DIVERSITY PREDICTION METHOD FOR TRANSFORMER SELECTION

TECHNICAL FIELD

The invention relates generally to electrical energy demand estimation and, more particularly to methods for generating an estimate of the maximum electrical load demand requirements of a structure or facility for proper transformer selection.

BACKGROUND OF THE INVENTION

In the electric power distribution industry, there are many building models focusing on the thermal shell of a facility and the efficiencies of the installed equipment. These modeling approaches are based on a philosophy of heat gain and heat loss. These models require a great deal of effort to use and are more focused on overall energy usage than on energy demand. Modifying these building models for energy demand would be impractical for widespread use and would still require modification for behavior effects leading to diversities.

The owner of the invention is a large power company that supplies energy to approximately 4.2 million customers over a 120,000-square-mile service territory spanning several states. The power company includes four regulated retail electric utilities. Annually, the power company purchases approximately 70,000 distribution transformers.

When comparing the Kilovolt-Amp (kVA) demand loading on an electric power company's substations with the actual connected transformer nameplate kVA, it was found that, on average, the distribution transformers were not being heavily loaded. This finding was supported by historical evidence that a very small number of transformers fail due to overloads. Utilities could realize significant savings with an improved transformer size selection process for new facilities. Utilities could save in investment and operations by more closely sizing transformers to actual load, while still operating within acceptable risk and safety limits.

At the heart of this transformer size selection problem is a basic business issue of how to allocate an investment in distribution transformers based on balancing risk, value, and performance in an uncertain environment. Before a building to be served is built, and the actual load metered, the transformer size and design must be selected. To minimize risk and investment costs, each step of the process needed to be investigated and improved. The first and most crucial step in correctly sizing a transformer is to estimate the customer's future energy demand (kVA or watts). This includes the initial gathering of information and then applying the information to forecast the demand.

SUMMARY OF THE INVENTION

The embodiments of the invention provide methods to produce an estimate of the maximum electrical load demand requirements of a new facility given the anticipated equipment in the facility. The embodiments disclosed estimate the facility load, given a level of risk acceptable to the engineer, while dealing with varying combinations of equipment loads.

A method, system, and computer program product are provided for selecting a transformer size for a facility. As used herein, facility generically refers to industrial and commercial type facilities, although the techniques described could be applied with modification to residential facilities. A plurality of end-use connected load data for the facility is entered via a user interface into a memory of a computing system for determining facility load diversities. A base homogeneity is determined for the end-use connected load data. An initial facility diversity is determined based on the end-use connected loads and initial end-use diversities. A total facility diversity is determined based on the initial facility diversity, the base homogeneity, and a total connected load. An expected energy demand is determined based on the total facility diversity and a total connected load. The end-use diversity is adjusted for at least one end-use and a change in expected energy demand for the facility is allocated to each end-use. The transformer size is determined for a total expected energy demand and a total hours use for each connected load.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

FIG. 6 illustrates an exemplary transformer sizing chart based on energy demand and annual hours of use.

FIG. 7 illustrates an exemplary user interface for entering customer data into a software utility for estimating end use diversities in an exemplary embodiment.

FIG. 8 illustrates an exemplary user interface for entering customer load data into a software utility for estimating end use diversities in an exemplary embodiment.

FIG. 9 illustrates an exemplary output display generated by the software utility for estimating end use diversities in an exemplary embodiment.

DETAILED DESCRIPTION

Figure 1:
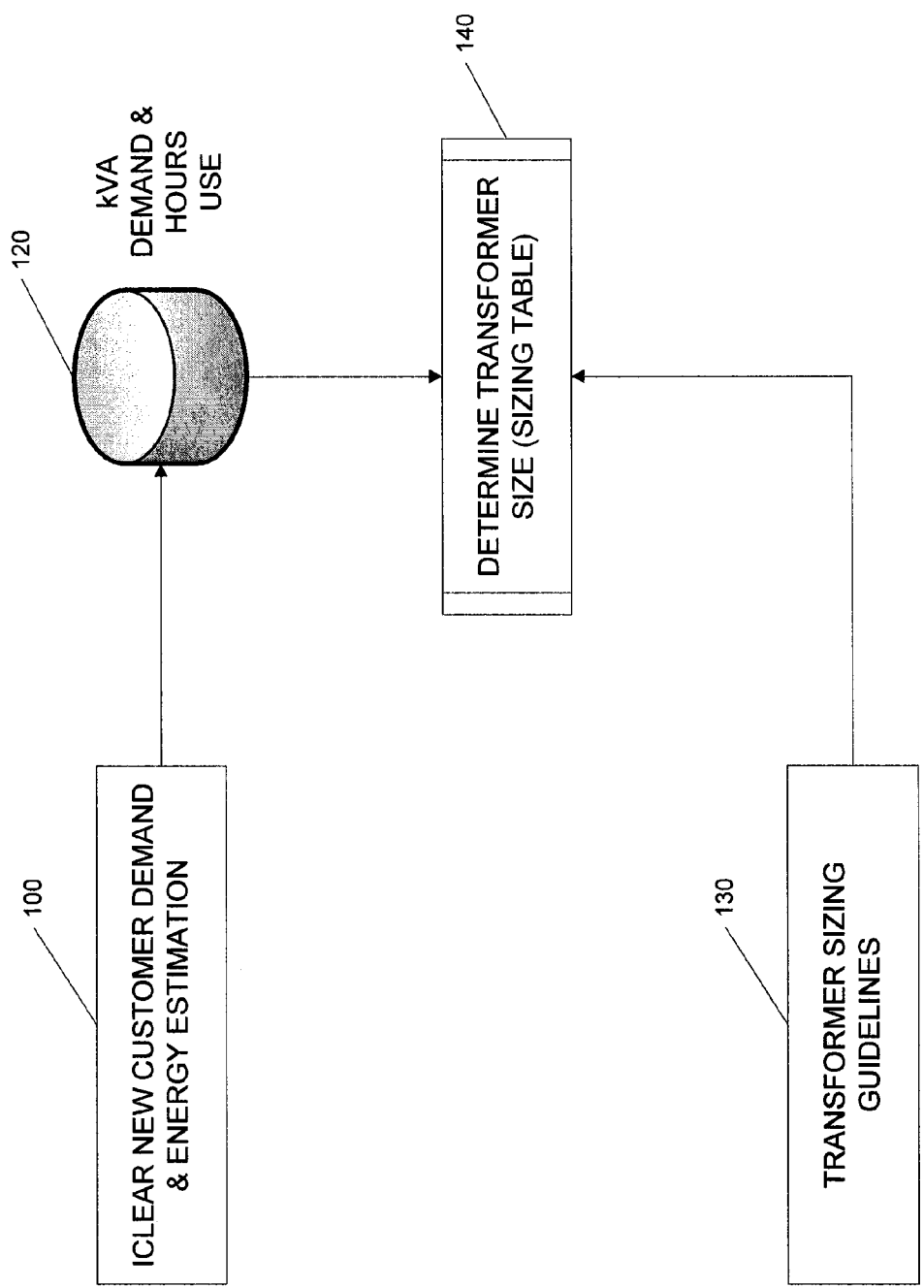
FIG. 1 illustrates a high level process flow diagram for transformer sizing in accordance with an exemplary embodiment.

The following description is provided as an enabling teaching of embodiments of the invention including the best, currently known embodiment. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of the invention and not in limitation thereof, since the scope of the invention is defined by the claims.

An estimate of the demand for a new facility is required in order to economically select the proper transformer size. Traditionally, the approach to performing this estimate was to total the connected loads for each end-use of the facility and to estimate the individual diversity for each end-use load. The total connected end-use loads of the building is performed by summing the total of the nameplate ratings of the equipment. This concept can easily be understood with regards to the lighting load. The total lighting connected load of the building is just the sum of the wattage of each bulb. This is done for each end-use (or type of equipment).

The easiest approach for solving the energy load-estimating problem is to look at demand requirements for national accounts such as Wal-Mart, The Home Depot and McDonald's. These types of businesses generally build new facilities that closely match existing facilities. A simple listing of the existing facility energy demand provides an easy and accurate estimate of what the new kVA demand would be. These facility demands provides an initial starting point for evaluations. The problem with this approach is that even such facilities can vary tremendously because they have different sizes and installed equipment in the buildings. Furthermore, most facilities are not associated with national accounts and have unique components.

The field engineer or marketing representative has a variety of factors to consider in the process for estimating the energy load. These factors include the type of building (e.g., office, restaurant, retail); the size of the building; the appliances in the building; and the diversity for each appliance. The diversity is the percent of the total maximum connected load of the appliance expected to be seen at the time of the building's peak usage. Selection of the correct diversity factors is critical in estimating the new customer's energy demand and, therefore, the correct transformer size. Previously, the marketing representative depended on past experience or general rules of thumb.

As a starting point for estimating energy demand, actual metered demands were collected from billing data for demand rate customers. The maximum winter and summer demands were determined from several years of history and were compared with the original estimated demand forecasted for the facility. These findings supported the initial concerns regarding transformer sizing. Frequently, the customer's estimated demand, which is used to size the transformer, was significantly greater than the actual maximum energy demand. In order to do a better job of sizing and loading distribution transformers, a better method was needed to estimate the customer's energy demand. Even a small improvement in transformer sizing could result in very significant annual cost savings. In order to get better results, field representatives needed better information and a way to use that information.

A demand distribution database was generated for existing customers that contained information regarding customer type, building area, electrical end-use equipment, original forecasted maximum demand, and actual metered maximum demand. This database was used to develop a distribution of actual demand per square foot and end-use equipment diversity factors. The estimated diversities (percent of connected load operating at the time of the building peak demand) are used in calculating the expected building maximum demand. Using actual metered demands and totals of installed appliance connected loads from plans and diversities that were estimated from the data, an initial estimate can be developed. The energy demand estimator uses distributions of demand per-square-foot to check the forecasted demand against actual historical demand. In this way, regardless of the size of the building, the energy demand estimator would know how the new building compares to other similar uses. The energy demand estimator could then check this demand versus the historical demand. If the judgment is that this building is typical, then the building kVA demand per square foot should be close to the average. The majority of buildings are close to the median kVA demand per square foot. Therefore, if the software user is forecasting a deviation from that point, there needs to be a solid reason for the deviation.

Figure 7:
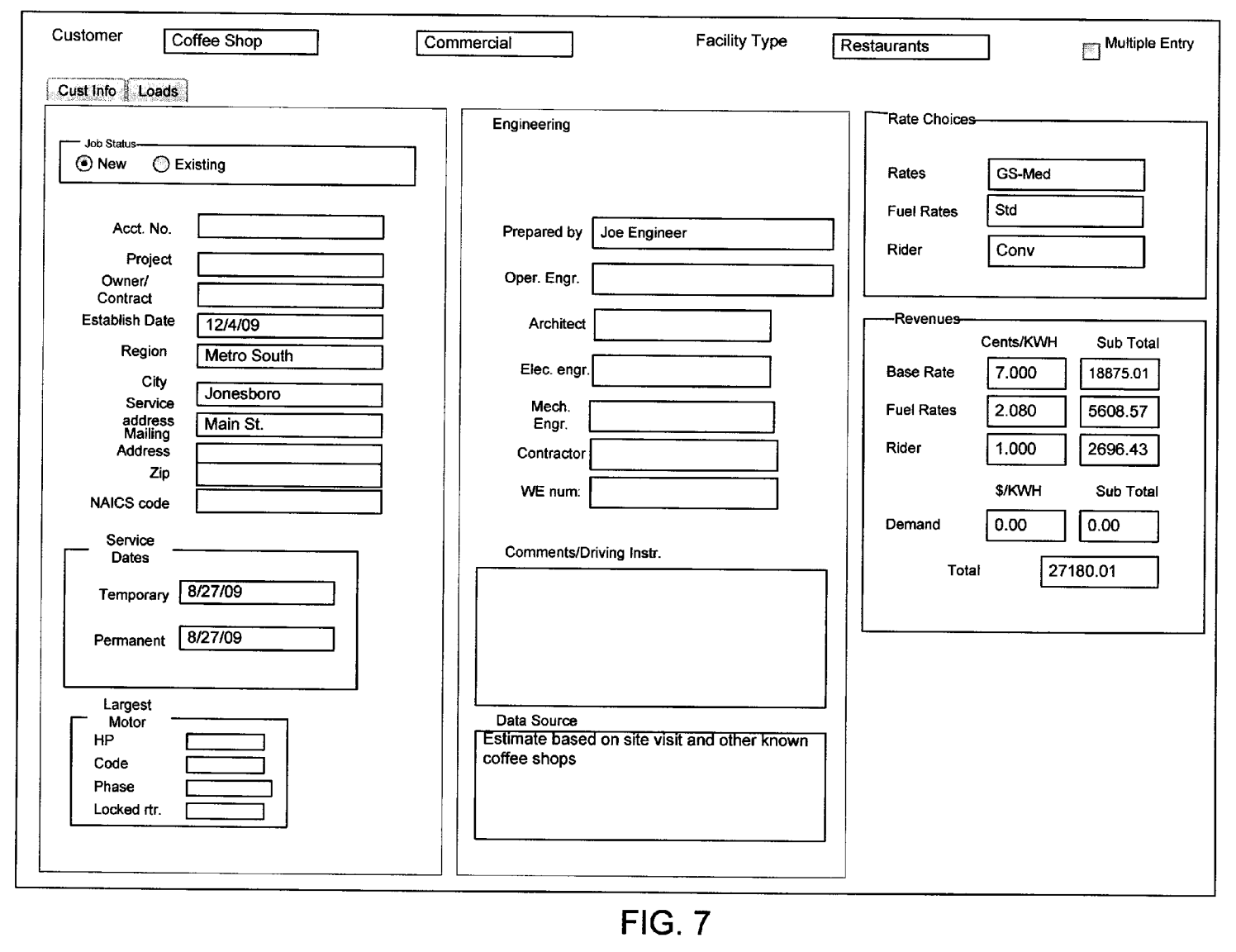

In one embodiment, a software utility referred to herein as Industrial/Commercial Load Estimating and Referencing (iCLEAR) implements these concepts. The iCLEAR utility allows the user to select the customer facility type, such as restaurant, office building or church, and the area of the building. FIG. 7 illustrates an exemplary user interface for entering customer data into the iCLEAR software utility for estimating end use diversities in an exemplary embodiment. Next, the user enters the connected load of the appliances to be used in the facility (i.e., the end uses). This information is derived generally from the plans for the facility and contains information such as the kVA connected load of the HVAC equipment, the total lighting load (literally counting light bulbs), motor loads, etc.

Figure 8:
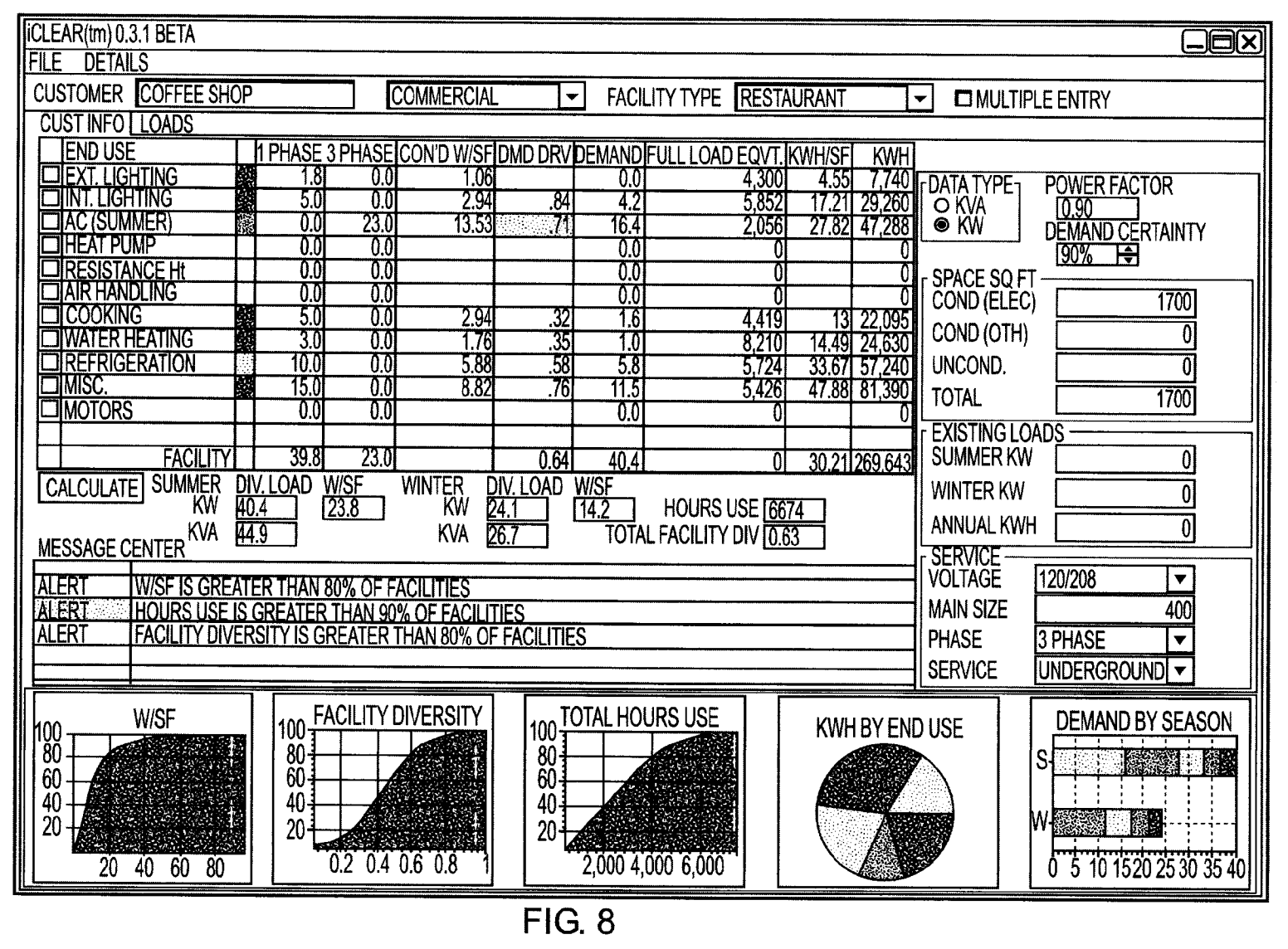

Based on an analysis from billing and survey data, the iCLEAR software utility applies a diversity factor to the end-use loads specified by the user. In one embodiment, the user has the option of using the default diversity factors calculated from the database of all buildings, or modifying the default diversities, if these are strong reasons for doing so. The sum of the diversified end-use loads is the kVA demand for the building. FIG. 8 illustrates an exemplary user interface for entering customer load data into the iCLEAR software utility for estimating end use diversities in an exemplary embodiment.

The calculated demand is then compared with the kVA (or watts) per square foot for other customers of the same type as a check to ensure that the calculated value is in the expected range. One feature of the iCLEAR software utility is the calculation of the hours-use number for the customer. This number is defined as the total annual kWh divided by the maximum kW demand, and can also be thought of as the number of hours of annual peak demand. The magnitude of this number is an excellent indicator as to the general shape of the energy load duration curve for the customer. The higher the hours-use number, the flatter the load shape, i.e., closer to a constant energy load. The lower the number, the more "peaked" the load shape. Knowing the general shape of the load-cycle curve is essential to knowing the loading effect on the distribution transformer. Loads with a very high demand but a very low hours-use number may be served more effectively with a smaller transformer than loads of the same energy demand with higher hours-use loads.

Distribution transformers represent a significant cost to electric utilities, both as a capital investment and as an operating expense. Optimizing the total owning cost of distribution transformers can help utilities reduce this investment expense. Distribution transformers have a substantial tolerance to infrequent overloads. However, moderate overloads can cause a decrease in transformer life, the economic penalty of which can be traded off against the cost savings of selecting a lower kVA rating.

New sizing guidelines were developed based on the load-carrying analysis reflecting both energy and demand impacts. In general, the newly sized transformers were one to two transformer sizes smaller than transformer sizes that were specified in the past. This reflected both the new analyses and greater confidence in the improved forecasting methods.

Figure 2:
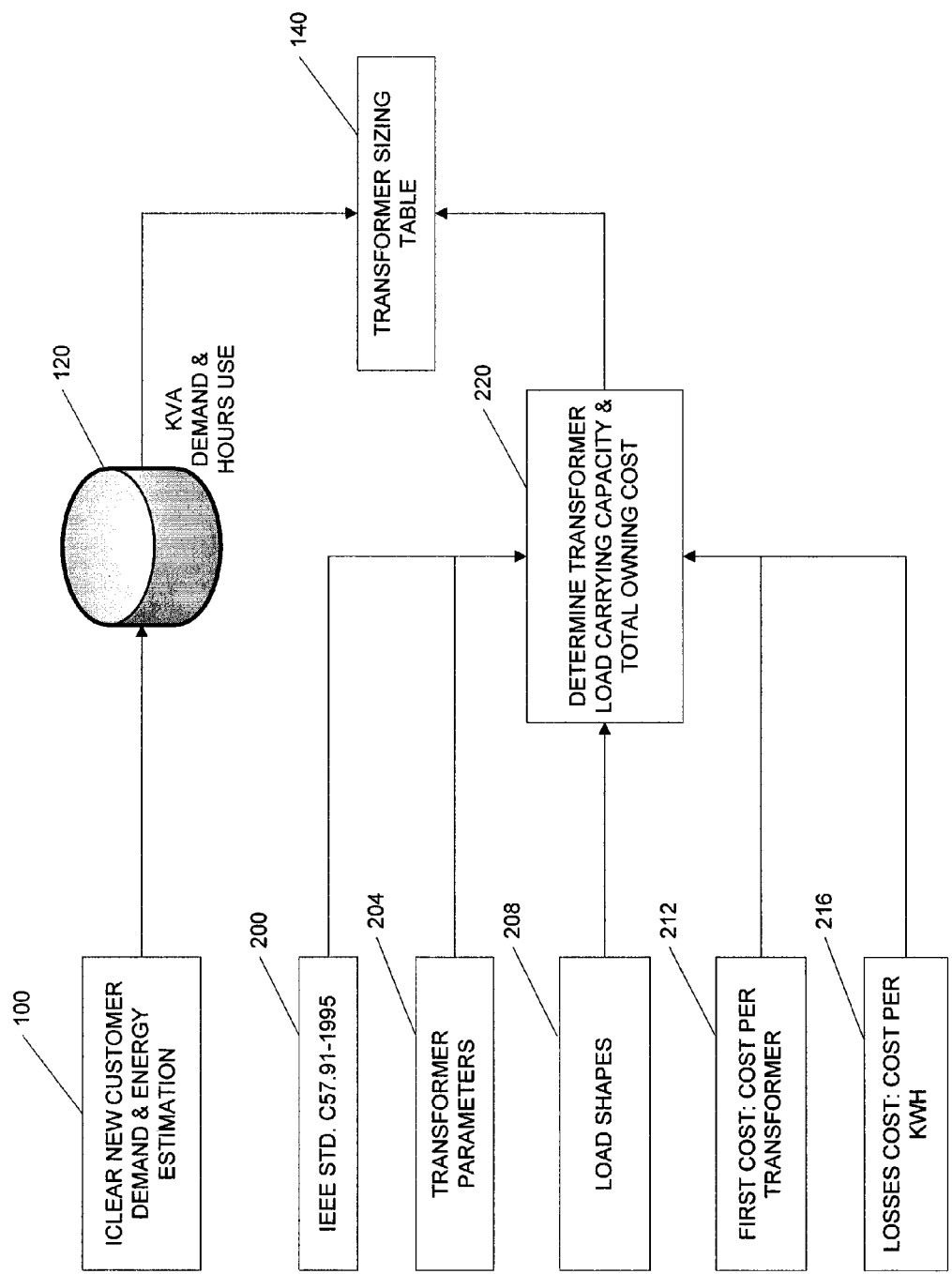
FIG. 2 illustrates a process flow diagram for determining transformer load carrying capacity and total owning cost in an exemplary embodiment.

The optimized sizing table is based on load carrying capacity and optimized cost. The optimized cost can be the least first cost, least losses cost or least owning cost. Using the ANSI/IEEE standards, transformers are analyzed for each combination of demands and hours use energy as shown in FIG. 2 (referred to as a cell). The transformer is eliminated from consideration if it cannot serve the load within the cell without failure. A transformer is determined to fail if the estimated oil temperatures in the transformer during operation exceed guideline temperatures, or if the estimated insulation life as modeled by the ANSI/IEEE standards falls below expected life in years.

The total owning cost of each transformer for each cell is calculated as the first cost (purchase cost of the transformer) and the losses cost. The losses cost is estimated based on the operating characteristics of the transformer and a load shape fitting the demand and energy characteristics of the cell. A specific transformer could be selected for each cell based on the optimization criteria (first cost, losses cost or total cost).

Generally a utility develops a purchase plan with a given number of designs (sizes and operating characteristics). It is impractical for a utility to buy and stock the large number of transformer designs. The large number of transformers selected has to be reduced which may result in some cells being served by a more expensive transformer. The goal therefore is to minimize to the degree possible this increase in cost. When a utility is developing a purchase plan and considering a multitude of transformer designs and sizes, an optimization technique can be used to minimize the cost of serving all customers in all cells given the constraint of a total number of designs purchased.

Using a fixed constraint of the number of transformers to be purchased, the cost of each transformer to serve each cell and an estimated number of customers by cell to be served, linear programming is used to optimize the overall cost of serving all customers given the number of transformer design constraints. The optimized purchase plan is then converted to the optimized sizing table.

Diversity measurement is a recognition that the eventual maximum demand of the facility is usually less than the total of the end-use demands. The maximum usage of each end-use usually occurs at different times. The water heater may peak in the evening, air conditioning in the afternoon, lighting in the morning. This is described by saying that the loads are diversified across different time periods. Conversely, at the time of the facility peak energy demand, only a partial amount of each end-use is contributing to that peak. The fraction of the end-use being used at the time of the facility peak energy demand is the diversity. Therefore, the maximum facility load is the following: Facility Max. Demand=Σ[(connected load for each end use)*(diversity for each use)], where the summation is across all end uses.

Traditionally, diversities were developed and used that reflected distribution engineer experience, engineering judgment, and perhaps some actual metering data. The result was no one was sure where the numbers came from or had great confidence in the numbers.

The first step in developing new diversities was to perform a linear regression analysis. The linear regression can be performed using commercially available software statistical packages. Using linear regression, the recorded metered billing demand was set as the dependent variable and the connected loads for each end-use category were the independent variables. Under this structure, solving for the regression coefficients means that the coefficients are the median diversities for the facility, which can include a plurality of buildings.

Attempting to implement a software modeling program using statistical processes presents the risk of over-fitting. Over-fitting is the result of developing parameters that explain the training observations too well, including any noise or unusual features in the training dataset. The result is that although the parameters may maximize predictions on the training data, the software model will not perform well on new data. This condition is called over-fitting. The solution is to develop a model that performs less well on the training data, but better than an over-fit model on new, additional data (e.g., validation set).

By design, the median coefficients produce median estimates of total maximum facility demand. Therefore, in theory, the estimates should be expected to be greater than actual facility demand approximately 50% of the time and less than actual facility demand 50% of the time. A more conservative approach to estimating total maximum facility demand is to forecast for the 90th percentile, meaning that 90% of the observations would be below this value and 10% would be above this value.

The linear regression based estimates fail to perform well in cases with extreme mixes of end-use loads. The extreme mixes occur when there are only one to three end-uses or when there is a very predominant load, i.e., one end-use load accounting for a high percentage of the connected loads. Under these circumstances, the diversities should be higher because there are fewer end-uses against which to apply diversity. Under such circumstances, the facility peaks when the major load peaks.

The solution to these concerns was to develop a modeling scheme based on the Total Facility Diversity (TFD) estimates and a statistic called base homogeneity. The TFD approach uses the linear regression based diversities discussed above modified by engineering judgment and available metered data. The TFD is simply the weighted average of the individual end-use diversities weighted by the amount of connected load.

The best results were achieved using a homogeneity measure based on the Gini Index of heterogeneity across six basic end uses: lighting, air conditioning, cooking, water heating, refrigeration, and motors. Miscellaneous connected loads are excluded from this analysis because they are not homogeneous by definition.

The Gini Index is a measure of statistical dispersion and can be calculated as follows:

$$G = 1 - \sum_{i=1}^{6} p_i^2$$

where:
i=the list of the six basic end-uses;
$p_i$=the fraction of connected load for end-use i.

It is easy to see that for cases where the entire load is in one end-use, the value of the Gini Index is zero. This case is called perfect homogeneity. The Gini Index can be restated so that the value of zero (perfect homogeneity) is one and the value decreases as homogeneity decreases. This is accomplished by subtracting the Gini Index from one. This statistic is referred to herein as Base Homogeneity reflecting the calculation of the base loads identified above. Therefore, as a formula:

Base Homogeneity $y=1-G$

This simple transformation allows for a positive sign to increase the overall facility diversity when homogeneity increases.

A second parameter is the overall estimate of TFD from applying the new diversities. The overall estimate of TFD is calculated as the sum of the new end use diversities times the connected loads divided by the sum of the connected loads.

Using these two parameters, an estimate for a set of data with known metered demands and connected loads can be generated with the iCLEAR software utility. This data set is a separate data set than used for the original regression based estimates. Therefore, this data set serves as a validation set, reducing risk of a model that is overfit and that would not generalize well. Quantile regressions can be run to produce parameters for bounds from 5% to 95% in 5% increments. Quantile regression is similar to linear regression but allows the user to estimate the bounds required.

Therefore, after calculating the TFD and the base homogeneity, the required engineering limits can be developed and these estimates will reflect the extreme cases (of connected loads) through the inclusion of the base homogeneity in the calculation.

The final model structure is:

Total Facility Diversity(TFD)=$\beta_1$*Base Homogeneity+$\beta_2$*Initial Facility Diversity(IFD)

Stated in terms of diversity, the TFD is:

$$TFD = \frac{\sum \text{End}-\text{Use Connected Load}_i * \text{New End}-\text{Use Diversity}_i}{\sum \text{End}-\text{Use Connected Load}_i}$$

The new end-use diversities are estimated by adjusting the original end-use estimates of diversity to reflect the increased demand of the TFD (these are the new end-use diversities in the above equation). The new end-use diversities are calculated in the following steps:

Step 1: Determine maximum possible diversity increase for each end-use. The maximum possible diversity increase is the lesser of the following:

(1—original diversity); and

Total Demand Change/end-use connected load.

Step 2: Allocate Total Demand Change based proportionally on the original end-use diversified demands subject to the limits of the maximum possible demands above.

Because of the limits of maximum possible diversity increase, steps 1 and 2 are iterated until all of the Total Demand Change is allocated to an end-use.

FIGS. 1-5 illustrate the processing logic for using diversities and transformer load carrying capacity for transformer sizing in an exemplary embodiment. FIG. 1 illustrates a high level process flow diagram for transformer sizing in an exemplary embodiment. New customer demand and energy estimation are generated by the iCLEAR software utility (block 100), and are input into database 120 that stores kVA demand and hours use. Transformer sizing guidelines (block 130) and new customer kVA demand and hours use are provided to an algorithm for determining transformer size as indicated in processing block 140. FIG. 9 illustrates an exemplary output display generated by the software utility for estimating end use diversities in an exemplary embodiment.

FIG. 2 illustrates a process flow diagram for determining transformer load carrying capacity and total owning cost in an exemplary embodiment. A transformer operating model based on IEEE standard C57.91-1995 ("IEEE Guide for Loading Mineral-Oil Immersed Transformers") (block 200), transformer parameters (block 204), load shapes (block 208), cost per transformer (block 212), and cost per kWh (block 216) are inputs into an algorithm for determining load carrying capacity and total owning costs as indicated in processing block 220. The outputs from this determination are inputs, along with the customer energy demand and hours use, into the transformer sizing table 140. The transformer sizing parameters (block 204) include, but are not limited to, loss ratio, rated top oil rise, rated top oil time constant, oil exponent, winding exponent, rated hot spot over top oil temperature, no load losses, and load losses. FIG. 6 illustrates an exemplary transformer sizing table for a given load and an annual load factor.

Figure 3:
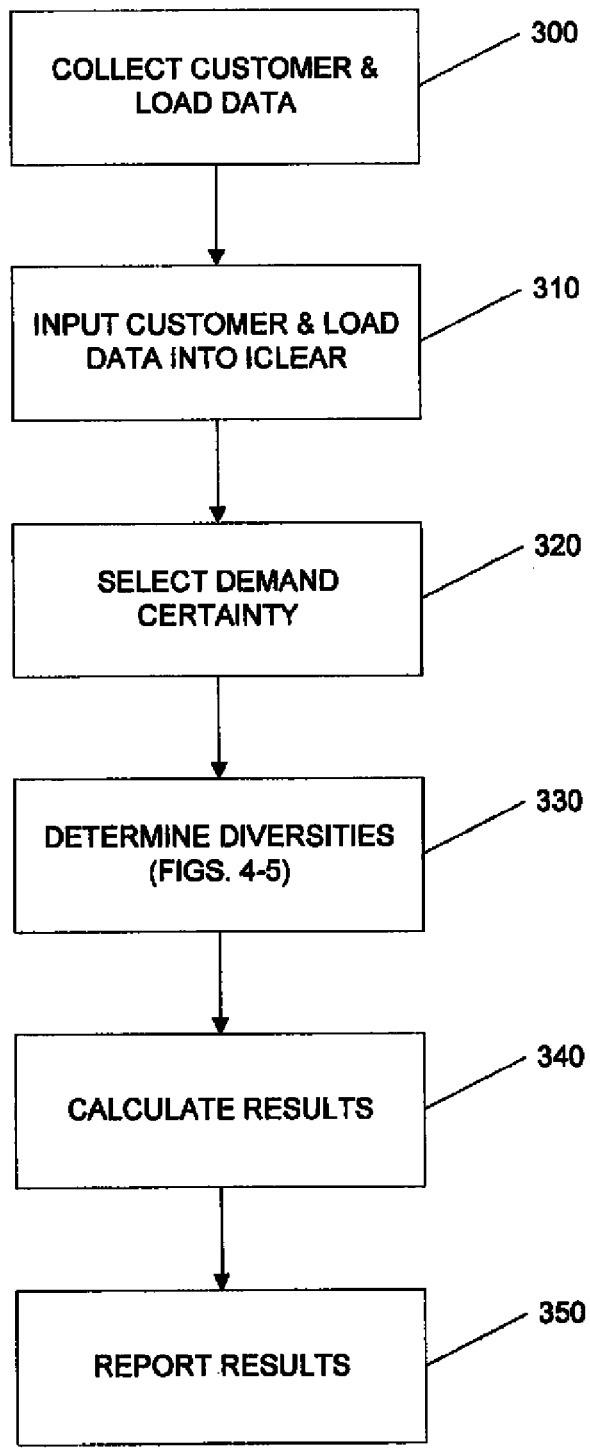
FIG. 3 illustrates the processing logic for estimating the energy demand for a new facility in an exemplary embodiment.
Figure 4:
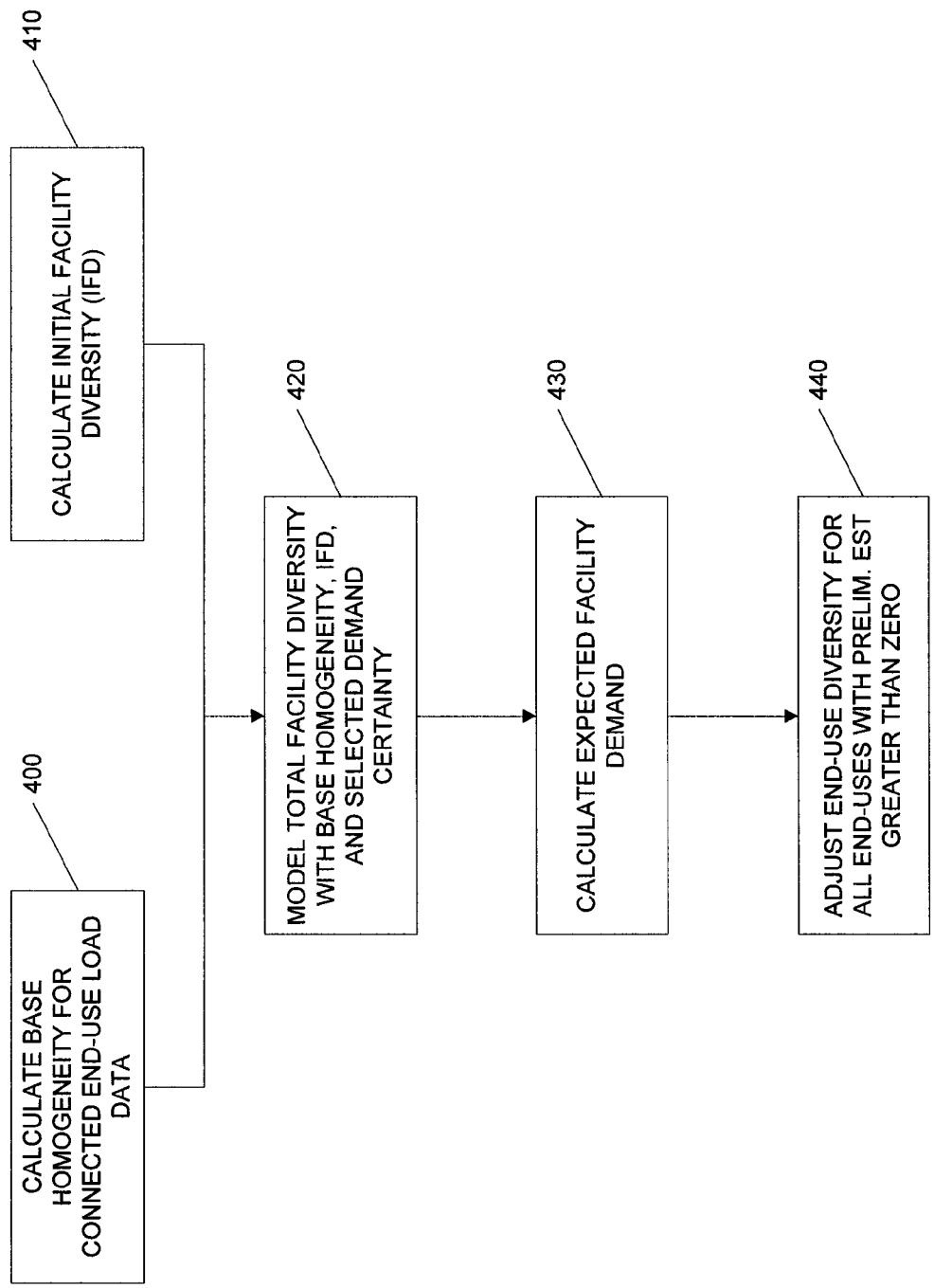
FIG. 4 illustrates the processing logic for the diversity evaluation in estimating the energy demand for a new facility in an exemplary embodiment.
Figure 5:
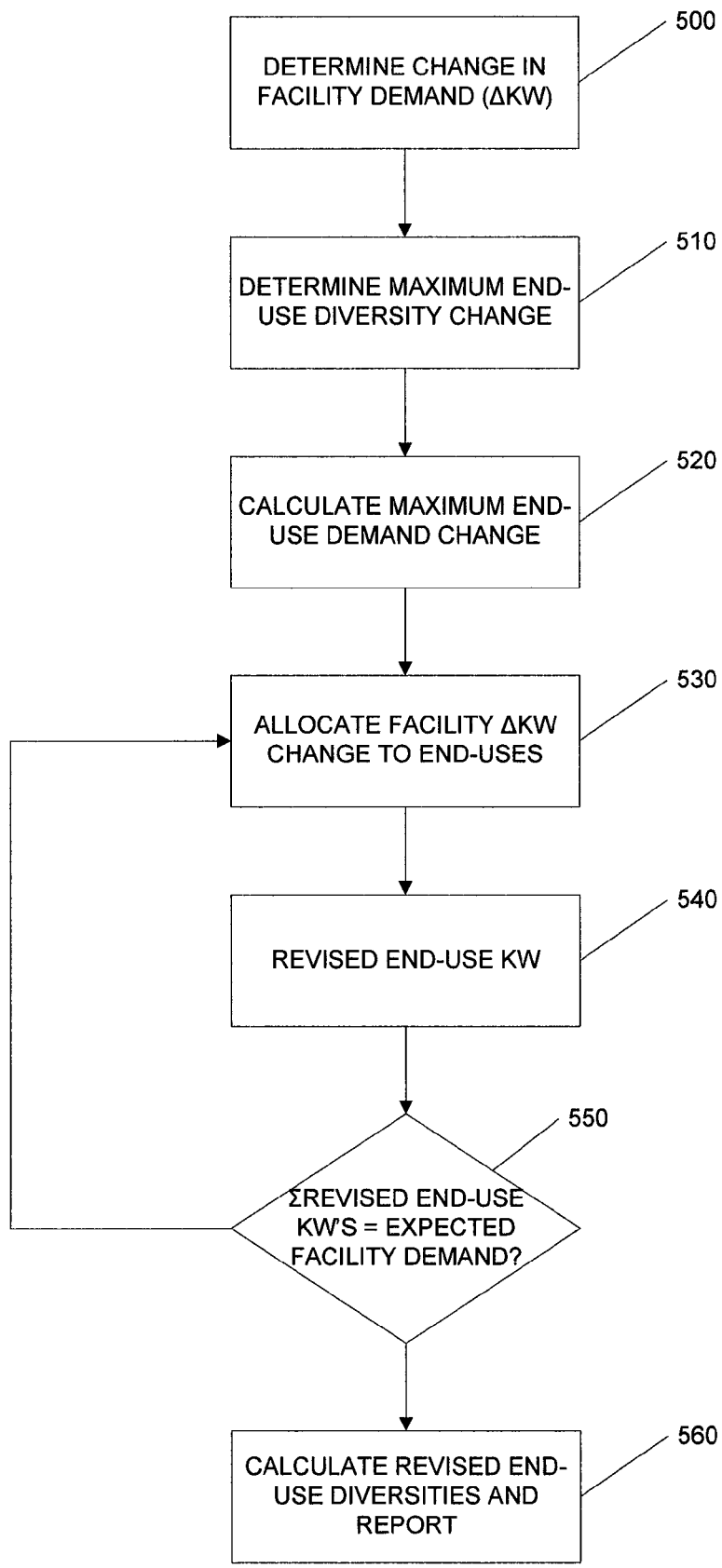
FIG. 5 illustrates the processing logic for adjusting end-use diversity in estimating the energy demand for a new facility in an exemplary embodiment.

FIG. 3 illustrates the processing logic for estimating the energy demand for a new facility in an exemplary embodiment. Customer and load data is collected as indicated in logic block 300. The customer data includes customer name, address, rate, contracts, etc. The load data includes end-use connected loads, facility area, and service characteristics. The customer and load data are inputs to the iCLEAR software utility as indicated in logic block 310. The demand certainty is then selected by the distribution engineer in logic block 320. Diversities are then determined as indicated in logic block 330. FIGS. 4-5 illustrate exemplary processes for determining diversities. Results are calculated as indicated in logic block 340. FIG. 8 illustrates an exemplary user interface for estimating end use diversities based on customer load data and diversities in an exemplary embodiment. The results are reported to the distribution engineer as indicated in logic block 350.

FIG. 4 illustrates the processing logic for the diversity evaluation in estimating the energy demand for a new facility in an exemplary embodiment. Base homogeneity for the connected end-use load data is calculated as indicated in logic block 400. The initial facility diversity (IFD) is calculated as indicated in logic block 410. The initial facility diversity is based on the end-use connected loads and the initial end-use diversities. The total facility diversity is then modeled based on base homogeneity, IFD, and the selected demand certainty, as indicated in logic block 420. The expected facility demand is calculated as indicated in logic block 430. The expected facility demand is the product of the modeled TFD and the total connected load. The adjusted end use diversity is then determined for all end-uses having a preliminary estimated diversity greater than zero, as indicated in logic block 440.

FIG. 5 illustrates the processing logic for adjusting end-use diversity in estimating the energy demand for a new facility in an exemplary embodiment. The change in facility demand is determined as indicated in logic block 500. This is the difference between the modeled facility demand and the original estimate. The maximum end-use diversity change is determined as indicated in logic block 510. This is accomplished by selecting the minimum of one minus the initial end-use diversity, and the change in facility demand divided by the end use connected load. The maximum end-use demand change is then determined as indicated in logic block 520. This is accomplished by taking the product of the maximum end-use diversity change and the end-use connected load. The change in facility demand is allocated to end-uses as indicated in logic block 530. In this step, the portion of end-use maximum demand change to total facility demand change is determined. This portion is then multiplied by the end-use connected demand load. The revised end-use load is determined as indicated in logic block 540. The initial end-use load estimate and allocated end-use load are summed. If the result of the summation exceeds the connected end-use load, the end-use demand is set equal to the connected load. Next, as indicated in decision block 550, the sum of the revised end-use loads is checked to determine if the sum is equal to the expected facility total demand. If the sum of the revised end-use loads is equal to the expected facility total demand, the revised end-use diversities are calculated and reported as indicated in logic block 560. Otherwise, processing logic returns to the allocation step of logic block 530 in an iterative process until the total demand change has been allocated to end-uses.

Although the preceding description focused on application of the inventions described to industrial, manufacturing and commercial facilities, the inventive concepts described also can be applied to residential facilities. A residential facility involves the analysis of specific loads gathered from residential load research data. In a residential deployment, one transformer usually serves multiple homes, including high-density multi-family developments, where as many as several hundred units may be served. The key factor in estimating the energy demand of residential facilities is not only the size of the residences and the types of appliances used, but also the coincidence of the maximum demand of the residences. Multiple analyses are then performed to estimate the impact of all these factors on transformer sizing requirements.

Embodiments of the invention have been described as computer-implemented processes. It is important to note, however, that those skilled in the art will appreciate that the mechanisms of the embodiments described are capable of being distributed as a program product in a variety of forms, and that the invention applies regardless of the particular type of computer readable storage media utilized to carry out the distribution. Examples of computer readable storage media include, without limitation, recordable-type media such as CompactFlash cards, portable hard drives, diskettes, CD ROMs, memory sticks, and flash drives.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed:

1. A method for selecting a transformer size for a facility, comprising the steps of:
    storing a plurality of end-use connected load data for the facility via a user interface into a memory of a computing system for determining facility load diversities;
    determining a base homogeneity for the end-use connected load data;
    determining an initial facility diversity based on the end-use connected loads and initial end-use diversities;
    determining a total facility diversity based on the initial facility diversity, the base homogeneity, and a demand certainty factor;
    determining an expected energy demand based on the total facility diversity and a total connected load;
    adjusting the initial end-use diversity for at least one end-use and allocating a change in expected energy demand for the facility to each end-use; and
    determining the transformer size based on the expected energy demand and a total hours use for each connected load.

2. The method for selecting a transformer size of claim 1 further comprising determining a load carrying capacity and a cost of ownership for a plurality of transformers, wherein the load carrying capacity and cost of ownership are additional factors that are applied in selecting a transformer size.

3. The method for selecting a transformer size of claim 2 wherein determining a load carrying capacity and a cost of ownership for a plurality of transformers comprises applying a plurality of transformer parameters, a plurality of load shapes, a cost per transformer, a cost of losses per kilowatt-hour, and a transformer operating model to a transformer ownership cost optimization algorithm.

4. The method for selecting a transformer size of claim 3 wherein the cost of ownership for each transformer is determined by a purchase cost and a cost of losses, wherein the cost of losses is based on a plurality of operating characteristics of the transformer and a load shape fitting the expected energy demand.

5. The method for selecting a transformer size of claim 1 wherein the change in expected energy demand is a difference between the expected energy demand and an initial estimate of expected energy demand based on the initial facility diversity and the base homogeneity.

6. The method for selecting a transformer size of claim 1 wherein the base homogeneity is determined based on the fraction of the connected load associated with each of a plurality of basic end-uses, including one or more of lighting, air conditioning, cooking, water heating, refrigeration, and motors.

7. The method for selecting a transformer size of claim 1 wherein the initial facility diversity comprises a weighted average of the selected end-use loads and initial end-use diversities.

8. The method for selecting a transformer size of claim 1 further comprising applying a quantile regression model for the demand certainty factor to determine parameters to apply to the base homogeneity and the initial facility diversity to determine the total facility diversity.

9. The method for selecting a transformer size of claim 1 further comprising determining a maximum end-use diversity change.

10. The method for selecting a transformer size of claim 9 further comprising determining a maximum end use demand change based on the maximum end-use diversity change and the end-use connected load.

11. A system for selecting a transformer size for a facility, comprising:
    a computer processor for executing a plurality of components;
    a memory for storing a plurality of energy demand data for the facility;
    a component for storing a plurality of end-use connected load data for the facility into memory via a computing system user interface;
    a component for determining a base homogeneity for the end-use connected load data stored in memory;
    a component for determining an initial facility diversity based on the end-use connected loads and initial end-use diversities;
    a component for determining a total facility diversity based on the initial facility diversity, the base homogeneity, and a demand certainty factor;
    a component for determining an expected energy demand based on the total facility diversity and a total connected load;

a component for adjusting the initial end-use diversity for at least one end-use and allocating a change in expected energy demand for the facility to each end-use; and a component for determining the transformer size for the total expected energy demand and a total hours use for each connected load.

12. The system for selecting a transformer size of claim 11 wherein the component for determining a base homogeneity calculates an index value based on a fraction of the connected load associated with each of a plurality of basic end-uses.

13. The system for selecting a transformer size of claim 11 wherein the component for determining the initial facility diversity calculates a weighted average of the end-use connected loads and the initial end-use diversities.

14. The system for selecting a transformer size of claim 11 further comprising a component for applying a quantile regression model for the demand certainty factor to determine parameters to apply to the base homogeneity and the initial facility diversity to determine the total facility diversity.

15. The system for selecting a transformer size of claim 11 further comprising a component for determining a maximum end-use diversity change.

16. The system for selecting a transformer size of claim 15 further comprising a component for determining a maximum end-use demand change based on the maximum end-use diversity change and the end-use connected load.

17. A computer program product for selecting a transformer size for a facility when executed on a computing system, the computer program product comprising a non-transitory computer readable medium having computer readable code embedded therein, the non-transitory computer readable medium comprising:

program instructions that enable storing a plurality of end-use connected load data for the facility via a computing system user interface into a memory associated with the computing system;

program instructions that determine a base homogeneity for the end-use connected load data;

program instructions that determine an initial facility diversity based on the end-use connected loads and initial end-use diversities;

program instructions that determine a total facility diversity based on the initial facility diversity, the base homogeneity and a demand certainty factor;

program instructions that determine an expected energy demand based on the total facility diversity and a total connected load;

program instructions that adjust the initial end-use diversity for all end-uses and allocate a change in expected energy demand for the facility to each end-use; and program instructions that determine the transformer size for the expected energy demand and a total hours use for each connected load.

18. The computer program product for selecting a transformer size of claim 17 wherein the non-transitory computer readable medium further comprises program instructions for applying a quantile regression model for the demand certainty factor to determine parameters to apply to the base homogeneity and the initial facility diversity to determine a total facility diversity.

19. The computer program product for selecting a transformer size of claim 17 wherein the non-transitory computer readable medium further comprises program instructions for determining a maximum end-use diversity change.

20. The computer program product for selecting a transformer size of claim 19 wherein the non-transitory computer readable medium further comprises program instructions for determining a maximum end-use demand change based on the maximum end-use diversity change and the end-use connected load.

* * * * *